Feb. 14, 1928.

J. TEMPLETON 1,658,952

SWITCH

Filed Sept. 29, 1925

2 Sheets-Sheet 1

John Templeton, Inventor

Feb. 14, 1928.

J. TEMPLETON 1,658,952

SWITCH

Filed Sept. 29, 1925

2 Sheets-Sheet 2

John Templeton, Inventor

Patented Feb. 14, 1928.

1,658,952

UNITED STATES PATENT OFFICE.

JOHN TEMPLETON, OF DETROIT, MICHIGAN.

SWITCH.

Application filed September 29, 1925. Serial No. 59,322.

This invention relates to direction indicating systems for automobiles and similar vehicles.

An important object of the invention is to provide a direction indicating system which will be automatically operated by the steering mechanism of a vehicle.

Another object of the invention is to provide an indicating system which will indicate the intended direction of travel of the vehicle.

Another object of the invention is the provision of an automatic signalling system which may be efficiently employed as a parking light.

Still another object of the invention is the provision of a system of the above character which may be efficiently employed upon auxiliary headlights of the dirigible type.

A still further object of the invention is the provision of an automatically operated signal apparatus of simple and durable construction and designed to operate efficiently.

Other objects and advantages of this invention will become apparent as the description progresses.

Figure 1:
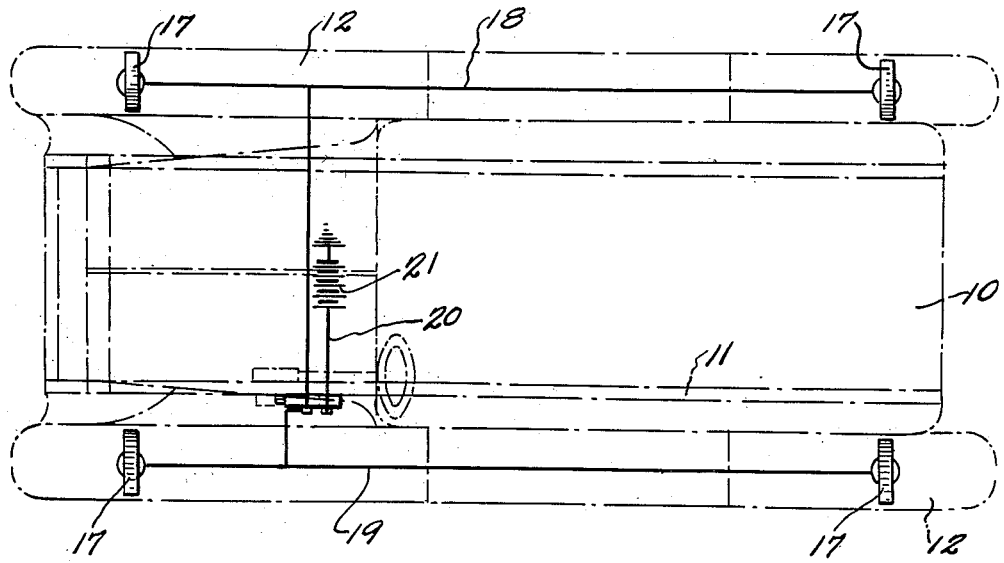
Figure 2:
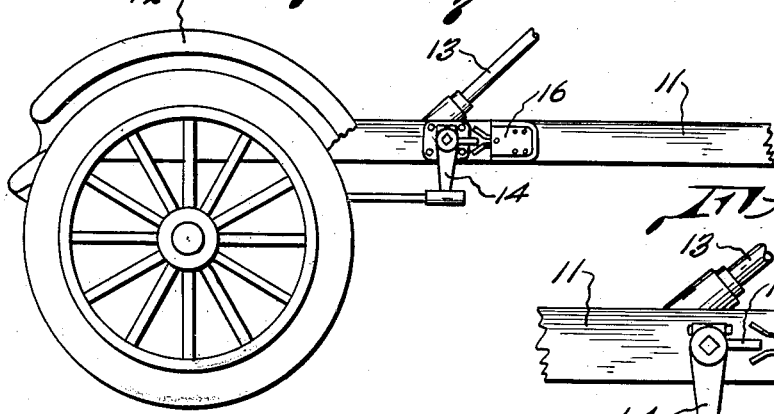
Figure 3:
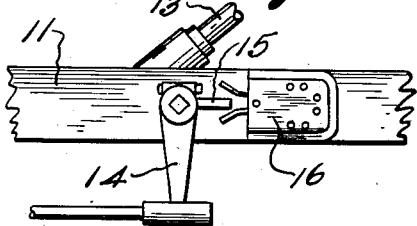
Figure 4:
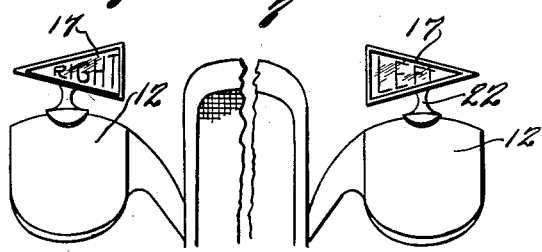
Figure 5:
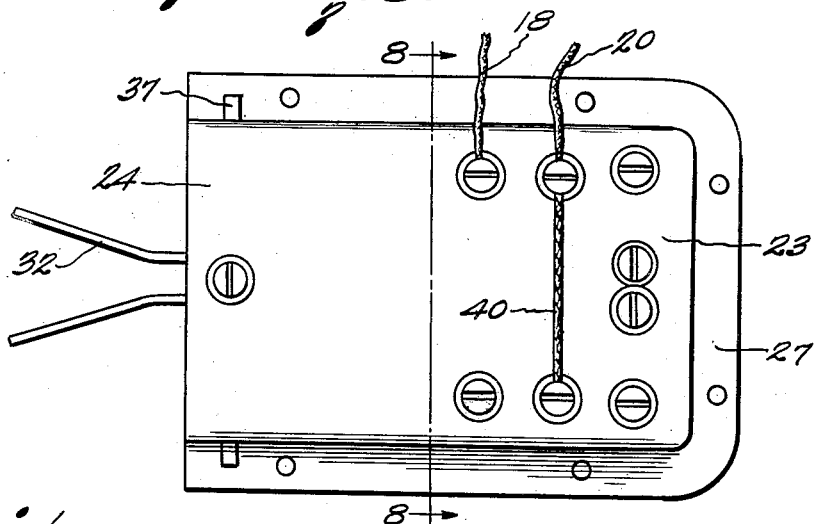
Figure 6:
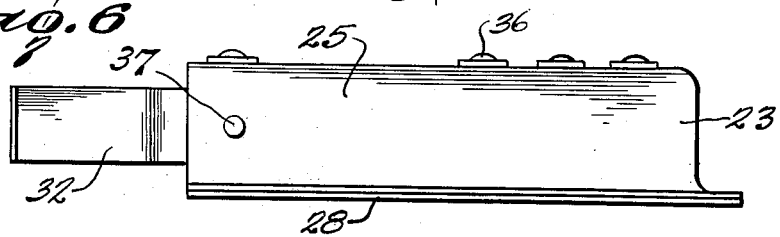
Figure 7:
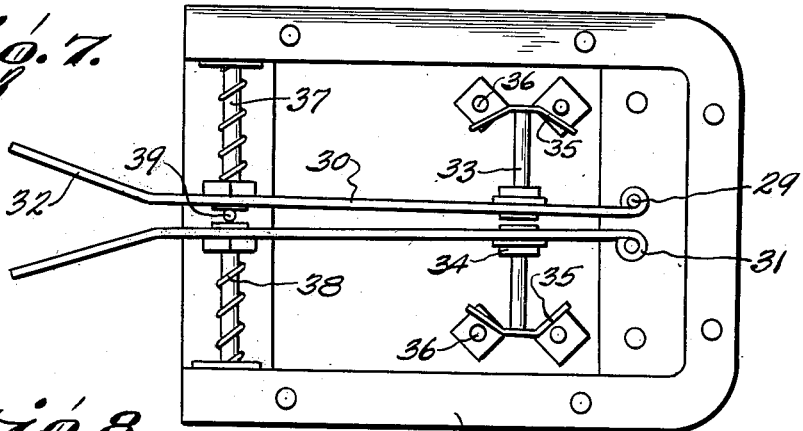
Figure 8:
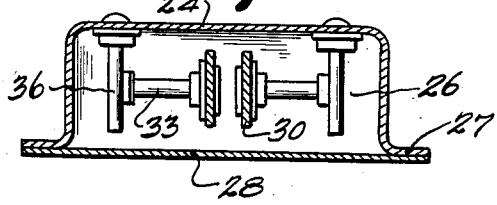

In the accompanying drawings, forming a part of this specification and in which like numerals are employed to designate corresponding parts throughout the same:

Figure 1 is a top plan view of an automobile, shown in dotted lines, showing the connection of my improved system thereon, Figure 2 is a fragmentary side elevation of an automobile frame showing the manner of mounting my improved apparatus in association therewith, Figure 3 is an enlarged view of a fragmentary portion of a vehicle frame disclosing in detail the manner of connecting my improved switch member in asociation with the conventional automobile structure, Figure 4 is a fragmentary front elevational view of an automobile showing the manner of mounting my improved indicating signal thereon, Figure 5 is a top plan view of the switch mechanism used in connection with my improved signalling system, Figure 6 is a side elevation of the same, Figure 7 is a bottom plan view with the bottom plate removed, and Figure 8 is a transverse sectional view taken on the line 8—8 of Figure 5.

In the drawings, wherein for the purpose of illustration is shown the preferred embodiment of my invention, the numeral 10 generally indicates the body structure of the conventional type of automobile embodying the usual chassis frame beams 11 with fenders mounted on the sides thereof. As it is desirable, in carrying out my invention, to automatically operate the signal through the medium of the vehicle steering mechanism, a common form of this mechanism is illustrated, the numeral 13 designating the steering wheel shaft the lower end of which commonly carries a worm meshing with the worm wheel pivotally mounted in one of the frame beams. The shaft which supports the worm wheel projects through the beam and on the outer side thereof carries a movable steering pitman arm 14, suitable apparatus connecting with this arm for steering the forward vehicle wheels. It is to be noted that the foregoing structure is old in the art and well known, and therefore, forms no part of my invention, being merely illustrated to indicate the application of my improved apparatus in association therewith.

In order to adapt the foregonig structure for the automatic operation of my improved signalling system, the upper bearing clamp of the pitman arm 14 is provided with a transverse opening extending in alignment with the frame beam for receiving an operating pin 15. This pin may be threadedly mounted in the upper end of the pitman arm or sweated therein being arranged so as to extend generally at right angles to the pitman arm in a rearwardly projecting position.

My invention further contemplates the provision of a switch mechanism generally indicated by the numeral 16 to be mounted, when used upon a vehicle employing the foregoing type of steering apparatus, on the outer side of the frame beam upon which the steering mechanism is connected. This switch is mounted in close proximity and rearwardly of the pitman arm so as to be operable by swinging movement of the operating pin 15. Mounted adjacent the upper and lower edges of the switch mechanism are a pair of terminal connecting posts, arranged in opposed relation to permit connection of suitable signal members and connection with a battery or other source of energy.

With particular reference to Figure 1 of the drawings, it will be noted, that the front and rear fenders of the vechicle carry transversely mounted signal casings 17 clearly visible to front and rear traffic and connected with the switch mechanism by conducting wires 18 and 19. These wires each connect with a terminal post on opposite sides of the switch casing, the electrical circuit being continued by a battery wire 20 shown in this view connecting with a diagrammatic illustration of a battery 21.

As will be clearly apparent as the description progresses, operable movement of the steering wheel will close the switch mechanism so as to illuminate the signal casings at one or the other side of the vechicle, that is, illuminate the front and rear casings on the right or left hand side designating the intention to pursue a right or left hand course.

In order that this intention on the part of the driver be unmistakably understood, it is intended to provide triangularly shaped casings supported on suitable brackets 22 and carrying the words "right" or "left" depending of course whether or not the signal is placed upon the right or left hand side of the vehicle. These signal casings, as clearly shown in Figure 4, are preferably mounted in elevated position upon the vehicle fenders and may be thus readily observed forward of or in rear of the machine.

Referring now more particularly to the switch structure, I employ a rectangular shaped casing 23 composed of a top plate 24, side plates 25 and a rear end plate 26. The lower edges of the side and end plates are turned at right angles to provide a continuous flange 27 provided with a plurality of apertures arranged at spaced intervals for connection of the casing upon the vehicle frame. The bottom of the casing is enclosed by means of a separable bottom plate 28 also having apertures aligning with those formed in the flange 27, while the forward end is opened. This casing structure is preferably constructed of hard rubber or other insulating material for the efficient operation of the device. Arranged adjacent the rear end of the casing and secured to the upper portion thereof are a pair of transversely aligned stub shafts 29 positioned adjacent the center of the casing for pivotally supporting a pair of transversely movable contact arms 30. These arms are of comparatively long structure the inner ends being rolled to provide bearing sleeves 31 while the outer ends project substantially from the open end of the casing and are bent at an acute outward angle, as at 32. Secured to the intermediate portions of the arms 30 adjacent the inner ends thereof are a pair of transversely outwardly extending rods 33. Secured to the arms 30 by means of nuts 34 and carrying on their outer remote ends V-shaped contact strips 35 arranged so as to move into engagement with a pair of longitudinally aligned terminal post bars 36 secured to the top plate and depending downwardly within the casing upon each side thereof. When the contact strips are forced into engagement with the terminal post bars 36, the circuit is closed and the electrical energy transmitted to the signal lights on one side of the vehicle.

Secured to the arms 30 adjacent the forward ends and extending in opposed relation transversely of the casing are a pair of guide bars 37 the outer remote extremities extending through suitable apertures in the side walls of the casing and movable therethrough. Each of these guide bars carries a coiled compression spring 38 adapted to normally urge the arms 30 in adjacent positions toward the center of the casing. This inward movement of the arms 30 is restricted by the provision of a center pin 39 secured to the top plate of the casing and depending downwardly therein, the arms normally remaining in contact with this member. This structure provides a compact switch mechanism the working elements of which are adequately protected from the weather and designed to operate in an efficient and reliable manner.

In operation, the primary purpose of the apparatus is to form an automatic signalling system whereby suitable signal lamps will be illuminated simultaneously with the steering of the vehicle so as to indicate to forward and rear traffic the intended path of the operator. This is accomplished in the following manner.

As the steering wheel of the vehicle is rotated for operation of the front wheels, the steering pitman arm will be swung from a vertical position as shown to advantage in Figures 2 and 3, to an angular forward or rear position, causing similar movement of the operating pin 15 secured to this arm. As the pin 15 is swung in an arc, it engages the upper or lower of the contact arms 30 forcing one of these members transversely toward the side of the casing. This action obviously causes one of the transverse rods 33 to move towards the terminal posts or bars 36 whereby the contact strips 35 will engage the terminal post bars and close the circuit between these members. As is clearly shown in Figure 5 of the drawings, the terminal posts adjacent the inner end of the casing 16 are connected by a conducting wire 40 while one of these posts in turn connects with the battery 21 through the medium of the conducting wire 20. The terminal posts are arranged adjacent the inner end of the casing to connect with the wiring systems extending from the signals 17 mounted on the vehicle fenders. Each of these wiring systems comprises a conducting wire extending between and connecting with the signals on each side of the vehicle and a connecting wire extending to one of the terminal posts.

This arrangement causes both the front and rear signals on one side of the vehicle to be illuminated when the steering mechanism is operated in one direction, and the illumination of the signals upon the opposite side upon reverse movement of the steering wheel.

My device is not restricted to this particular use, as it is apparent that the apparatus may efficiently serve as a parking signal, this being accomplished by slightly turning the front wheels of the vehicle after the vehicle has been placed in its parking position. It is further contemplated to employ my improved apparatus for the illumination of roadways at night, this particular adaptation embodying the provision of auxiliary headlights mounted in angular positions upon the forward end of the vehicle for clearly illuminating dangerous curves in the road, the auxiliary headlights in this instance also being operated automatically by movement of the steering mechanism.

It is contended that a signal apparatus of exceedingly simple design is embodied in my improved mechanism, designed with a view of producing a durable and an efficiently operating device. One of the principal advantages to be noted is the fact that my improved apparatus may be readily mounted upon various types of vehicles after construction and without materially altering or in any manner defacing the structure and appearance of the vehicle.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, what I claim is:

1. In an automatic signalling system for vehicles, a switch mechanism embodying a casing, a pair of arms movably mounted in the casing, a pair of terminal posts arranged at each side of the casing, means for closing the circuit between the said terminal posts upon outward movement of the switch arms, and a pin mounted upon the steering mechanism of the vehicle adapted to actuate the switch arms upon steering the vehicle.

2. In a signal apparatus, a switch adapted to be mounted upon a vehicle adjacent the steering mechanism embodying a rectangular casing, a pair of switch arms pivotally mounted in the casing, means for normally urging the said arms towards the center of the casing, terminal posts extending within the casing, bars carried by the intermediate portions of the switch arms adapted to contact with the terminal posts upon downward movement of the arms, and a pin adapted to be mounted in association with the steering apparatus of the vehicle arranged to operate the switch upon movement of the steering apparatus.

3. In a signalling apparatus for vehicles, a switch embodying a rectangular casing, stub shafts mounted in the casing, contact arms pivotally mounted upon the said stub shafts and projecting from one end of the casing, transverse bars mounted adjacent the inner ends of the arms, contact strips mounted on the outer extremities of the said transverse bars, terminal posts adapted to engage the contact strips upon outward movement of the arms, guide bars mounted adjacent the outer ends of the contact arms, coiled springs positioned upon the guide bars adapted to normally urge the contact arms towards the center portion of the casing, and a center pin adapted to restrict the inner movement of the said contact arms.

In testimony whereof, I have affixed my signature.

JOHN TEMPLETON.